Patented Nov. 11, 1941

2,262,454

UNITED STATES PATENT OFFICE 2,262,454

PEST CONTROL

Albert Lawrence Flenner, Wilmington, Del., assignor to E. I. du Pont de Nemours & Company, Wilmington, Del., a corporation of Delaware No Drawing. Application April 19, 1939, Serial No. 268,696

3 Claims. (Cl. 167—42)

This invention relates to pest control and describes new and useful adhesive compositions for horticultural spray suspensions consisting essentially of rosin residue dissolved in a water-miscible solvent.

Effective control of plant pests is not always so much a function of the inherent toxicity of the agents employed as it is of the assistance employed to give good wetting, good spray coverage and suitable loads. Thus, in the application of feeding inhibitors it is desirable to include an adhesive adapted to build up suitably high loads and to impart resistance to rainfall. The effectiveness of such adhesives determine in a large measure the effectiveness of the feeding inhibitor.

One such adhesive which has been found especially valuable for its excellent adhesive properties and its low cost is rosin residue. A suitable composition for incorporating the same in horticultural spray suspensions is disclosed in the Journal of Economic Entomology, vol. 20, No. 3, p. 583, and is known in the art as the Goodhue-Fleming rosin residue emulsion. While this composition has proved excellent for many purposes it frequently falls down where a very heavy retentive load of the spray residue is desired. It has been found, for example, that with certain organic feeding inhibitors such as phenothiazine the rosin residue emulsions cause excessive runoff of the sprayed material and do not give the desired heavy retentive loads. It has also been observed that the rosin residue emulsion in many cases gives an unsatisfactory blotchy deposit.

I have now found that by dissolving rosin residue in a watery-miscible solvent, preferably with the inclusion of a small amount of a material which will act as a wetting agent for the spray suspension, and dispersing this solution in the horticultural spray suspension the disadvantages pointed out above are avoided. Not only do my novel compositions give heavier and more retentive loads but also are more effective in that these results are obtained with smaller amounts of rosin residue.

It appears quite likely that these advantageous results are due to the fact that with my compositions the rosin residue is dispersed in situ in the spray suspension whereas with the rosin residue emulsion the rosin residue is introduced as a dispersion. Thus, in my novel compositions the particles of the spray suspension act as nuclei to absorb the rosin residue as it is dispersed in the spray suspension so that a more uniform dispersion of the rosin residue with respect to the particles of the spray suspension is obtained.

As illustrative of the compositions of my invention and their effectiveness as compared with the rosin residue emulsions I may cite the following:

EXAMPLE I

To one portion of a spray suspension containing 2 pounds of finely ground phenothiazine per 100 gallons of water was added 1 point of a 15 per cent solution of rosin residue in ethyl alcohol containing 0.75 per cent of a dispersing agent (the sodium salt of sulfated oleyl acetate). To another portion of the spray suspension was added 1 point of rosin residue emulsion (50% rosin residue emulsified with ammonium caseinate).

The two spray suspensions thus prepared were evaluated for load building properties and resistance to rainfall in the following manner:

Ten apples of uniform size were used per test. The surface area of each apple was determined before spraying and the stem cups were plugged to prevent build up in this area. The loads, therefore, represent the actual deposit on the surface of the apple. The apples were uniformly sprayed and allowed to dry for twenty-four hours. Each test was replicated and one replicate was then exposed to artificial rainfall for one minute. The dry apples were then washed in acetone and the phenothiazine in the washings determined by the method described in "Food Research" vol. 12, No. 4, 1937, page 305.

These evaluations, which are summarized in the following table, show that the rosin residue dispersed in situ in the spray suspension is substantially more effective in building up a heavy retentive load than the rosin residue added as an emulsion:

Table I

| Adhesive | Load (micrograms per sq. inch) | |
| --- | --- | --- |
|  | Initial | Final* |
| Rosin residue (solution) | 213 | 78 |
| Oversprayed | 364 | 235 |
| Rosin residue (emulsion) | 134 | 55 |
| Oversprayed | 232 | 153 |

*After exposure to artificial rainfall.

The composition described in the above example is particularly suited for organic feeding inhibitors such as phenothiazine which present a pronounced problem in preventing and controlling excessive run-off. With other materials such as lead arsenate, however, it is frequently desirable to increase the spreading action and for this purpose the amount of wetting agent included in the composition may be increased. In the following example there is illustrated a composition suitable for use with lead arsenate sprays and its effectiveness as compared with the rosin residue emulsion.

EXAMPLE II

To one portion of an aqueous spray suspension containing 3 pounds of finely divided lead arsenate per 100 gallons of water was added 1 quart of a 10 per cent solution of rosin residue in ethyl alcohol containing 2.5 per cent of wetting agent (the sodium salt of sulfated oleyl acetate). To another portion of the spray suspension was added one quart of rosin residue emulsion (50 per cent rosin residue emulsified with ammonium caseinate).

The two spray suspensions thus prepared were evaluated in the following manner:

Six apple trees were selected in an orchard and under identical conditions using the same spray apparatus three trees were sprayed with each of the spray compositions. After drying, 1400 grams of apples were taken at random from each of the sprayed plots and the load determined by washing the sprayed apples in dilute nitric acid and determining the lead arsenate deposited by analyzing for arsenic.

These evaluations show that the spray in which the rosin residue dispersed in situ in the spray suspension gives heavier and more uniform coverage than the spray in which the rosin residue was introduced as an emulsion. The results are summarized in the following table:

Table II

| Adhesive | Load (micrograms $As_2O_3$ per sq. in.) | Type of coverage |
|---|---|---|
| Rosin residue (solution) | 138 | Even, heavy deposit. |
| Rosin residue (emulsion) | 102 | Blotchy deposit (unsatisfactory). |

Thus, it will be seen that I have provided new and useful pest control adhesive compositions for use in preparing horticultural spray suspensions which are principally characterized as solutions of rosin residue in a water-miscible solvent. While these compositions employ a material, rosin residue, which has previously been suggested as a pest control adhesive (see U. S. P. 2,129,517 granted Sept. 6, 1938, to Lyle D. Goodhue), they are so formulated that they introduce the rosin residue into the spray suspension in an entirely different manner and give new and unexpected load building properties to the spray suspensions in which they are incorporated.

In the practical application of my invention I find that best results can be obtained with relatively dilute solutions. For example, I prefer that the rosin residue content be not greater than about 20 per cent and not less than about 5 per cent. With solutions of this character the rosin residue is so dispersed in the spray suspension to bring about maximum effectiveness, with the result that I obtain not only superior load building properties but also do so with much smaller quantities of rosin residue. Thus, as shown in Example I, I obtain much heavier deposits of phenothiazine with substantially less than one-third the quantity of rosin residue. Similarly, as shown in Example II, I obtain heavier and more uniform lead arsenate deposits with one-fifth the quantity of rosin residue. Even with the amount of rosin residue solution of Example II reduced to one pint 1/20 of that introduced by the rosin residue emulsion) I have obtained a deposit of 130 micrograms $As_2O_5$ per square inch as compared with 102 micrograms $As_2O_5$ per square inch for the rosin residue emulsion.

As the water-miscible solvent I prefer ethyl alcohol, not only because it is relatively inexpensive but also because it is non-phytocidal in the concentrations employed. Moreover, by dissolving the rosin residue in ethyl alcohol a purification of the rosin residue is effected in that any insoluble residue may be filtered off. The ethyl alcohol need not be pure and any of the common commercial grades will be found satisfactory.

Other water-miscible alcohols, such as propyl alcohol, isopropyl alcohol, and tertiary butyl alcohol, may be employed but do not possess the economic advantages of ethyl alcohol. Methyl alcohol can be used but is more undesirably toxic. Other water-miscible solvents such as ketones, amines, and glycol derivatives having the requisite solubility for rosin residue may also be used.

Various wetting and dispersing agents may be employed in these rosin residue solutions, and as previously pointed out may serve two functions, namely, (1) that of stabilizing the dispersion of rosin residue in the spray suspension, and (2) that of imparting wetting out properties to the spray suspension. For these purposes I prefer to employ the sodium salt of sulfated oleyl acetate which may be obtained by reacting oleyl acetate with concentrated sulfuric acid, oleum, chlorosulfonic acid, or other sulfuric acid derivatives of strongly sulfating or sulfonating properties. Other wetting and dispersing agents such as may be obtained by sulfating esters or ethers of unsaturated alcohols containing more than seven carbon atoms or by sulfating straight chain alcohols of more than seven carbon atoms may also be employed and may be referred to herein as the "sulfation products of alcohols containing more than seven carbon atoms." These products are usually employed in the form of their sodium salts, such as sodium decyl sulfate and the sodium salt of sulfated oleyl acetate. They may, however, be employed in the form of the salts of other bases, either of the inorganic or organic type.

It is not the purpose of this invention, however, to determine all the various types of wetting and dispersing agents which possess the requisite solubility in ethyl alcohol or other water-miscible solvents and the requisite wetting and dispersing properties for use in my compositions, since to investigate even a small portion of the available wetting and dispersing agents would involve expensive research and would serve no useful purpose. It will suffice, therefore, to point out that other wetting and dispersing agents such as isopropyl naphthalene sodium sulfonate and others may be employed.

The amount of the wetting and dispersing agent may be varied, depending on whether one or both of the above mentioned functions are desired. Thus, with pest control agents such as phenothiazine where run-off is a problem, it is desirable to limit the amount of wetting and dispersing agent. Suitably 0.25 to 1.0 per cent may be used depending upon the concentration of the rosin residue solution. With other materials such as lead arsenate it may be desirable to increase the amount of wetting and dispersing agent, but even in such cases it is not desirable to have much more than about 2.5 per cent of the wetting and dispersing agents since otherwise the effect of the wetting agent might prevent building up the desired heavy loads by causing excessive run-off.

Since many apparently widely differing embodiments of my invention may be made it is to be understood that such variations as come within the spirit and scope of my invention are intended to be included within the scope of the appended claims.

I claim:

1. A pest control adhesive composition for use in horticultural spray suspensions consisting essentially of a 5 to 20 per cent solution of rosin residue in ethyl alcohol containing 0.25 per cent to 2.5 per cent of the sodium salt of sulfated oleyl acetate.

2. A pest control composition for use in horticultural spray suspensions consisting essentially of a solution of rosin residue in a water-miscible solvent containing a material which will act as a wetting agent for the spray suspension.

3. A pest control adhesive composition for use in horticultural spray suspensions consisting essentially of a 5 to 20 per cent solution of rosin residue in ethyl alcohol containing 0.25 per cent to 2.5 per cent of a wetting agent.

ALBERT LAWRENCE FLENNER.